May 20, 1969  C. T. SPEAR  3,444,566
DEVICE FOR INTRODUCING SUBSTANCES INTO A TOILET BOWL TRAP
Filed June 8, 1967  Sheet 1 of 3

INVENTOR
Clifton T. Spear

BY
B. P. Fisleman
ATTORNEY

May 20, 1969 C. T. SPEAR 3,444,566
DEVICE FOR INTRODUCING SUBSTANCES INTO A TOILET BOWL TRAP
Filed June 8, 1967

INVENTOR
Clifton T. Spear
BY
B. P. Fishman Jr.
ATTORNEY

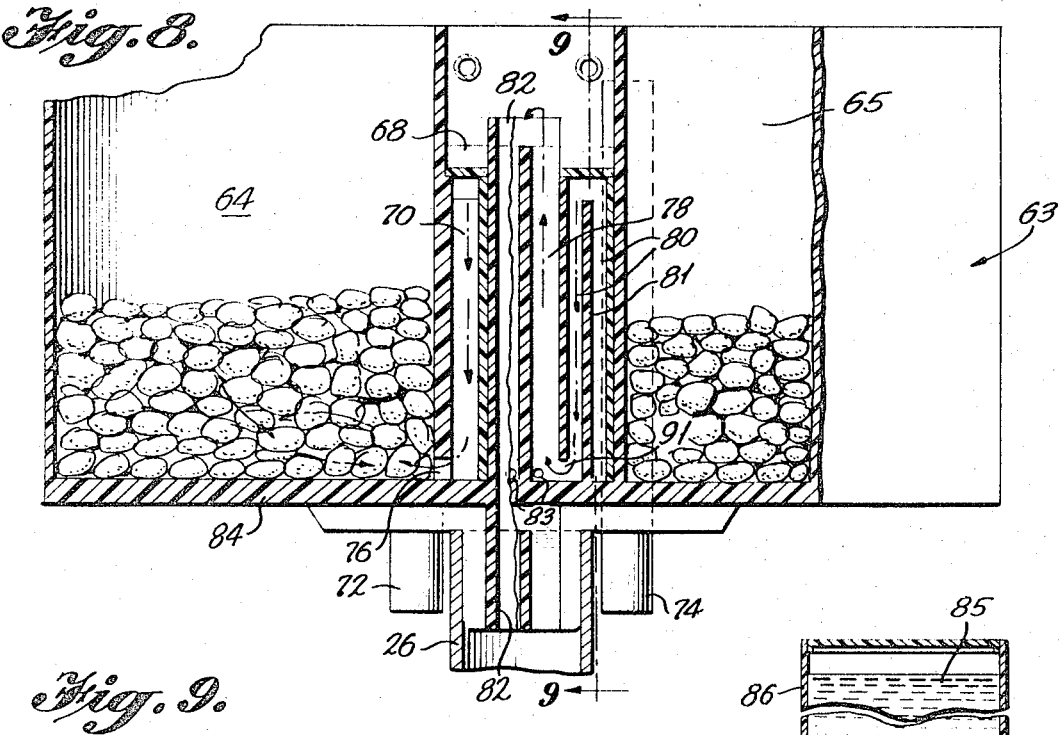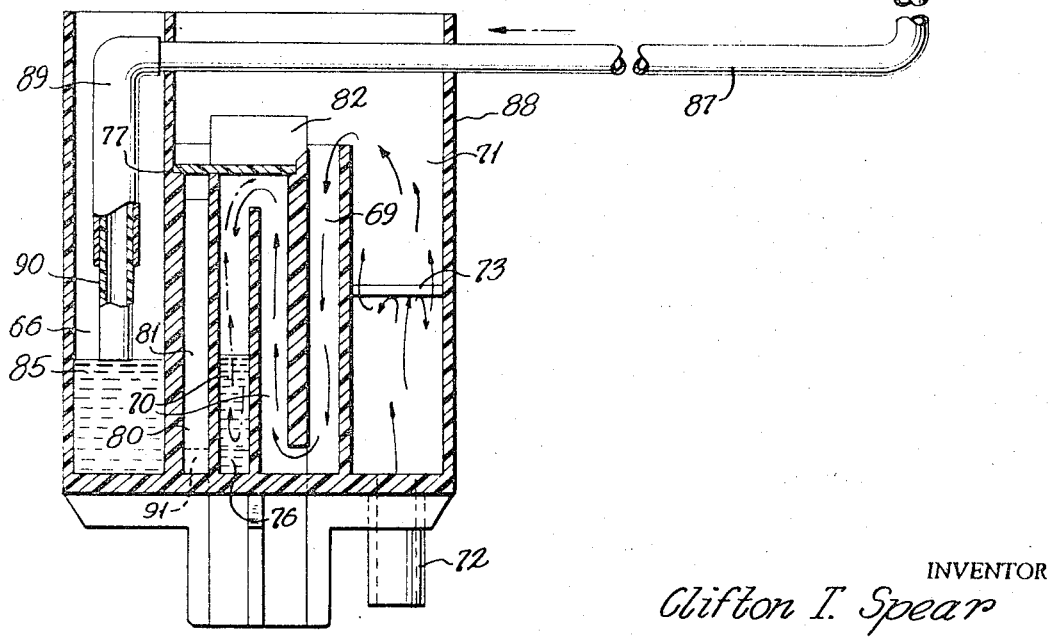

United States Patent Office 3,444,566
Patented May 20, 1969

3,444,566
DEVICE FOR INTRODUCING SUBSTANCES INTO A TOILET BOWL TRAP
Clifton T. Spear, % The Diamond Spear Co., Texarkana, Tex. 75501
Continuation-in-part of application Ser. No. 556,374, June 9, 1966. This application June 8, 1967, Ser. No. 644,603
Int. Cl. E03d 9/02; E03b 11/00; E03c 1/046; F17d 1/00
U.S. Cl. 4—228                                  7 Claims

ABSTRACT OF THE DISCLOSURE

A container for chemicals and the like mounted upon the overflow pipe of a toilet flush tank and having a connection with the trap refill tube and being chambered so that solutions are supplied in full strength to the bowl trap after completion of the flushing cycle through a unique siphoning action and without any diluting water.

CROSS-REFERENCE TO RELATED APPLICATION

Continuation-in-part of Ser. No. 556,374, filed June 9, 1966, Device for Supplying Chemical Disinfectant and the Like to the Trap of a Toilet Bowl.

BACKGROUND OF THE INVENTION

The invention relates to that class of device which supplies a disinfectant, deodorant, cleaner or like substance into the toilet bowl trap at the time of flushing the toilet.

The prior art contains numerous devices or schemes for accomplishing this but, in general, these devices are wasteful of the substances employed and are very inefficient in the sense that the substances are either lost completely due to overfilling of the trap or are excessively diluted when they arrive at the trap of the bowl.

SUMMARY OF THE INVENTION

The present invention provides a self-contained highly compact chamber receptacle within which chemicals and various solid and/or liquid additives are carefully mixed in a controlled manner with water supplied by the refill tube during the flushing cycle. The mixing is accomplished without turbulence. Only after completion of the flush-cycle and complete closing of the tank refill valve and complete water stoppage, is the solution from the receptacle delivered in full strength by siphoning to the bowl trap.

BRIEF DESCRIPTION OF THE DRAWINGS

FIGURE 8 is a vertical section taken on line 8—8 of FIGURE 7; and

FIGURE 9 is a fragmentary vertical section taken on line 9—9 of FIGURE 8.

DESCRIPTION OF THE PREFERRED EMBODIMENTS

Figure 1:
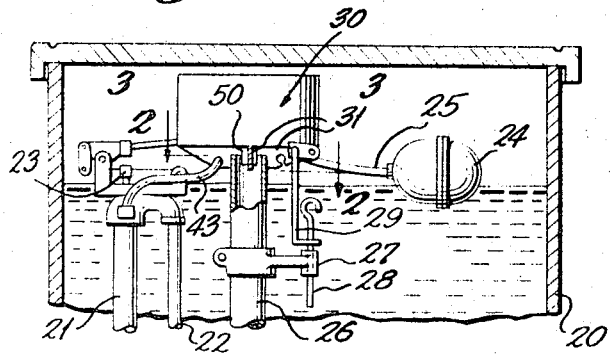
FIGURE 1 is a fragmentary side elevation of the flush and refill mechanism in a toilet flush tank, showing the invention applied to the mechanism, parts in section.
Figure 2:
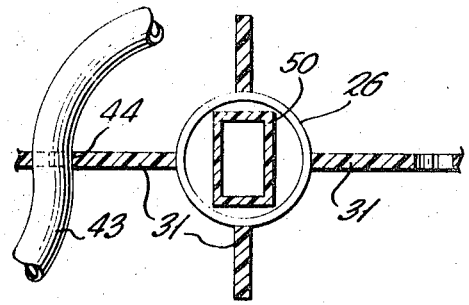
FIGURE 2 is an enlarged fragmentary horizontal section taken on line 2—2 of FIGURE 1.

Referring to the drawings wherein like numerals designate like parts, attention is directed first to FIGURES 1 through 6 showing a preferred embodiment utilizing solid chemical or other material to be introduced in solution into the bowl trap. In this connection, the various materials contemplated are preferably in tablet form, although they may be coarse granular lumps or pellets of random size, as shown in the drawings.

As shown in these figures, the numeral 20 designates a conventional toilet flush tank, FIGURE 1, having the usual water inlet pipes 21 and 22 to deliver water to the bottom of the tank. The conventional mechanism further includes an inlet valve 23 operated by a float 24 having a float arm 25 connected with the inlet valve in a well-known manner. A main overflow pipe 26 within the tank 20 communicates with the toilet bowl trap, not shown, and carries a guide 27 for stem 28 of the usual rubber flush valve ball, not shown. The rod 28 is lifted by a lever-operated draw link 29. All of this mechanism is conventional and well-known and need not be dealt with in further detail.

Figure 3:
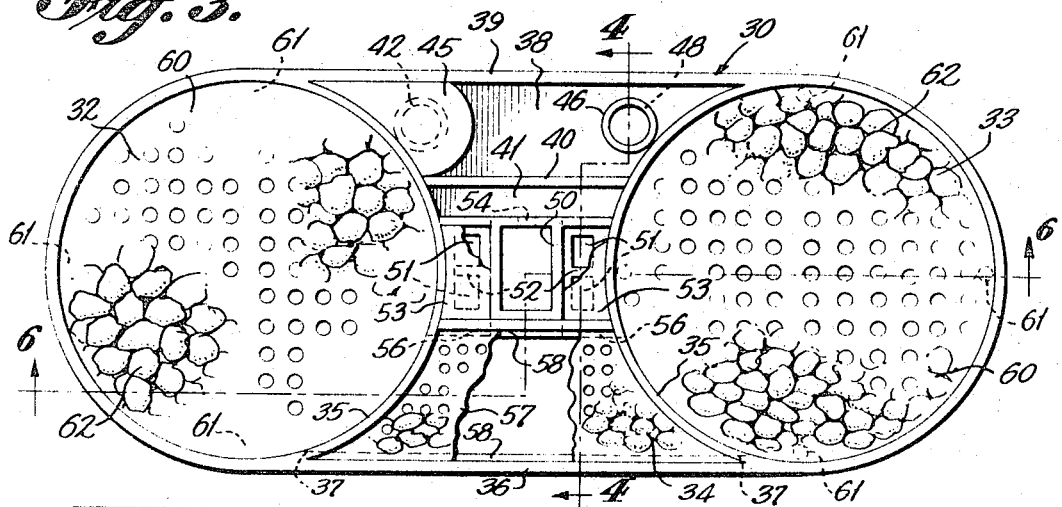
FIGURE 3 is an enlarged plan view taken on line 3—3 of FIGURE 1.

The invention proper comprises a relatively small receptacle or tank 30 of oblong configuration, FIGURE 3, mounted bodily and removably on the top of the overflow pipe 26 preferably by means of fins 31 which grippingly engage the overflow pipe and serve to support the tank 30. The tank 30 has a pair of end relatively large chambers 32 and 33 for solid chemicals and the like, an intermediate or connecting chemical chamber 34 bounded by the walls 35 of chambers 32 and 33 and the front main wall 36 of the tank 30. Openings 37 through the walls 35 place the intermediate chamber 34 in communication with the two end chambers 32 and 33.

The tank 30 on its opposite side has a control chamber 38 similarly bounded by the walls 35 and the opposite main wall 39. An interior baffle 40 separates the control chamber 38 from a relatively narrow release chamber 41 inwardly thereof. Water enters the control chamber 38 at the bottom thereof through a tubular fitting 42 adapted for connection with a small diameter tube 43 stabilized through an opening 44 in one of the fins 31. This tube 43 corresponds to the usual trap refill tube which leads from the water inlet pipe 21 and customarily empties into the top of the overflow pipe 26. This usual arrangement is omitted in the invention and instead, during the flushing cycle, the tube 43 supplies water to the bottom of control chamber 38. A baffle 45 is preferably located somewhat above the inlet fitting 42 to arrest or deflect the inrush of water into the chamber 38 and thereby prevent turbulence.

The chamber 38 also contains an auxiliary overflow tube 46 which extends to an elevation near and below the top of the tank 30 and is capable of directing water through the bottom wall 47 directly into the flush tank 20 under some circumstances. The auxiliary overflow tube 46 has a small opening 48 formed through the same adjacent the top face of the bottom wall 47, for a purpose to be described. If desired, an extension tube 49 may extend from the bottom of the tube 46, FIGURE 6, to eliminate splashing in the flush tank 20. This is an optional feature which need not be employed but is desirable.

The receptacle or tank 30 also has a centrally located fixed overflow pipe 50 built therein and having a lower end portion which projects below the bottom wall 47 and into the top of the main flush tank overflow pipe 26, as shown. The function of the pipe 50 will be described. On opposite sides of the fixed overflow pipe 50 are pairs of vertical siphoning passages 51 separated by divider walls 52 and whose tops are covered by plate elemens 53 spaced somewhat above the top edges of the divider walls 52. It may be mentioned here that the tank 30 or receptacle and all of its major compartments and passages is ideally adapted to be molded from certain well-known plastic which have the added ability of being rust and corrosion resistant.

The fixed overflow pipe 50 has a small opening 54 at the level of the bottom wall 47. The release chamber 41 communicates with the bottom of each bank of siphoning passages 51 through a passage or opening 55. The remote siphoning passages 51, that is to say, those passages closest to the side wall 36, communicate at their bottoms with the intermediate chamber 34 by means of passages or openings 56.

Within the intermediate chamber 34, near and above the bottom wall 47, is a perforated platform or strainer 57 which rests on narrow ledges 58, as shown. The element 57 supports a mass of solid chemical 59 or like material adapted to dissolve to a certain extent in water. The larger end chambers 33 also have perforated platforms or strainers 60 in their lower portions resting on integral legs 61 whose lengths may be varied by merely cutting off with a knife or scissors. In this manner, the heights of the strainers 60 above the bottom wall 47 may be varied relative to the residual water or solution which remains in the container 30 after the siphoning action. This is another optional refinement of the apparatus.

*Operation*

When the stem 28 is elevated to unseat the main ball valve element, not shown, the flushing water in the tank 20 will rush into the toilet bowl to flush the same and the contents including water in the bowl trap will discharge down the soil pipe. Immediately, when the float 24 is lowered by the flushing operation, the refill valve 23 will open and begin to admit water under pressure into the flush tank 20 through pipe 22 and simultaneously water begins to flow through refill tube 43 and fitting 42 to the bottom of control chamber 38. It will be understood that this inflow of water will begin even before the flush tank 20 has fully drained its contents and before the flushing operation is complete. It will continue until the inlet valve 23 is completely closed by the elevation of the float 24 to the normal position. There will be a period near the end of the refilling cycle where the flow through the pipe 22 and tube 43 is very slight although there is still some flow until the valve 23 shuts completely.

Figure 4:
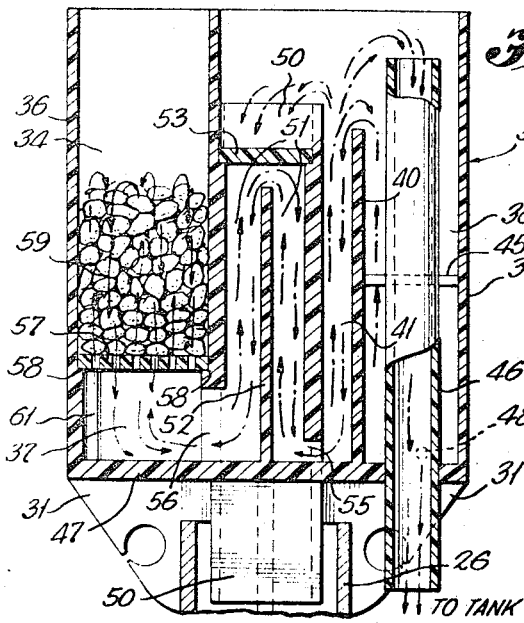
FIGURE 4 is a transverse vertical section taken on line 4—4 of FIGURE 3.
Figure 5:
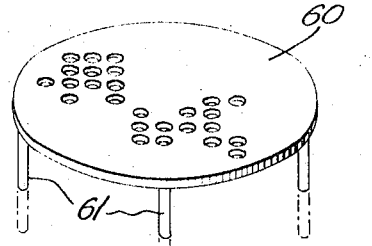
FIGURE 5 is a perspective view of a perforated platform employed in the mixing chamber.
Figure 6:
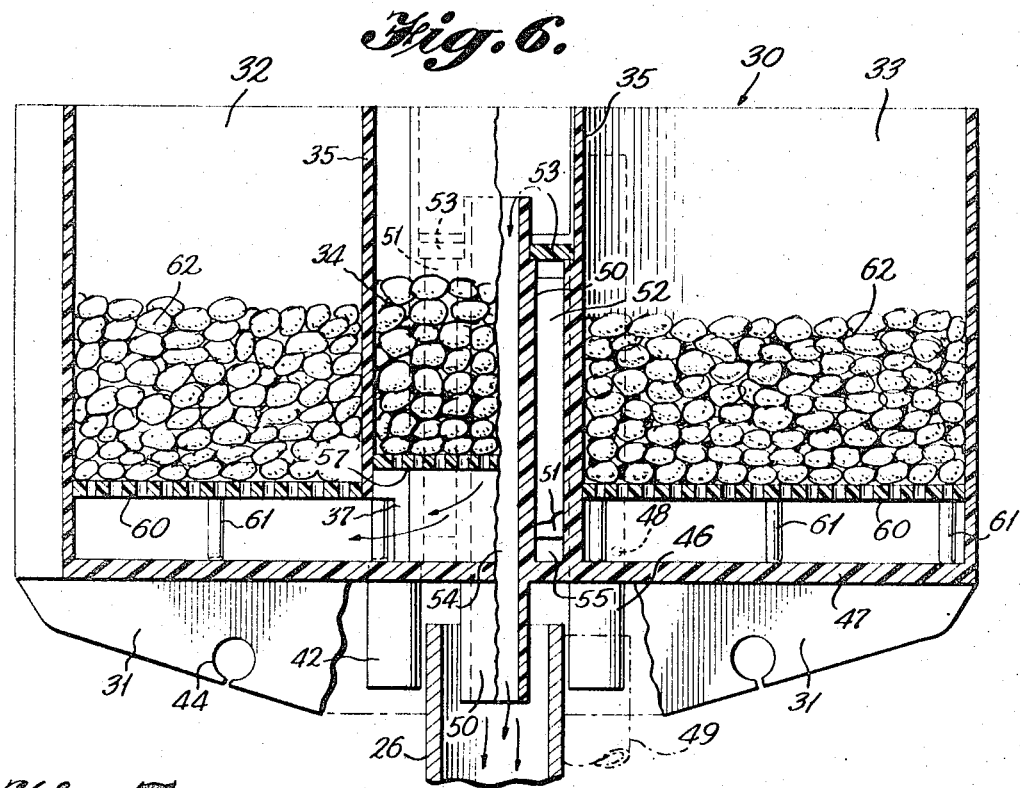
FIGURE 6 is a vertical section taken on line 6—6 of FIGURE 3.

Inflowing water from the tube 43 will gradually fill the control chamber 38 and flow over the baffle 40 into the release chamber 41 whereupon the water will pass through the two pairs or banks of siphoning passages 51 as shown in FIGURE 4 and will then enter the connecting chamber 34 by way of the passage 56. Once in the chamber 34, the inflowing water can enter the two end chambers 32 and 33 through the openings 37 near the bottoms thereof. The chambers 32 and 33 hold additional solid chemicals 62 or the like resting on the strainers 60. The water can continue to rise in the tank or container 30 until it reaches the top of built-in overflow tube 50 whereupon such water would pass downwardly through the tube 50 to the main overflow pipe 26. The auxiliary overflow tube 46 has its top end above the top of the tube or pipe 50 but below the extreme top of the tank 30, which top is defined by the continuous upper edges of the walls 35, 36 and 39.

When the water level in the tank 30 rises sufficiently, the chemical substances in the chambers 32, 33 and 34 will be immersed and some of the material will dissolve to produce the desired solution for subsequent entry into the bowl trap after completion of the flushing cycle and full closing of the valve 23. The chambers 32, 33 and 34, after receiving their quota of mixing water, will remain hydrostatically sealed during the complete flushing cycle up to the point where the inflow of water is very small due to partial closing of the valve 23. At this point, the remaining flow from the refill tube 43 will be insufficient to spill over the baffle 40 and into release chamber 41, and the small openings 48 of tube 46 will divert this small flow of water directly back into the flush tank 20. At this point, no further water from the tube 43 can enter the bowl trap and this condition of shunting the minute inflow of water into the tank 20 via the opening 48 and tube 46 will continue until the valve 23 completely closes and shuts off all of the water coming to the tube 43.

Were it not for the baffle 40, the gradual tapering off of the flow in the refill tube 43 would allow lowering of the water level in control chamber 48 and this would break the hydrostatic seal and the siphoning means would start feeding the chemical solution to the bowl trap before the refill water from the pipe 21 would be completely stopped. The aim of the invention is to deliver the full strength chemical solution to the bowl trap only after all of the refill water flow has stopped and the trap water is placid or undisturbed. This feature involving the baffle 40, release chamber 41 and small opening 48 therefore constitute a major improvement in the mode of operation over the prior art and over the subject matter of the parent application S.N. 56,374, above-mentioned.

At the proper time, after the valve 23 is fully closed, the draining or lowering of the liquid level in the control chamber 38 will initiate a siphoning action generally as described in the parent application and the chemical solution from the chambers 32, 33 and 34 will be drawn through the passages 56 and into the first pair of siphoning passages 51, then upwardly and over the walls 52 and downwardly through the second pair of passages 51 and out through the opening 54 of the built-in overflow pipe 50. The pipe 50 conveys the solution to the overflow pipe 26 of the flush tank which in turn communicates with the toilet bowl trap. The flow of chemical from the release chamber 41 into the built-in overflow tube 50 will be at a predetermined rate as determined by the size or number of the openings 54. The action of the siphoning passages 51 and release chamber 41 assures that there is a sufficient time delay prior to the feeding of the chemical solution into the bowl trap so that all inflow of fresh water through pipe 21 will have ceased and absolutely no water will enter the bowl trap after the invention starts the actual delivery of chemical solution.

Additionally, the use of the release chamber 41 allows the use of siphon banks 51 of ample size to complete the filling of the chemical chambers 32, 33 and 34 without interfering in any way with the desired rate of flow of the chemical solution into the commode trap, for, as stated, this latter function is controlled by the opening or openings 54 in the base of the pipe 50. It should be understood that a siphon will feed a restricted amount of fluid over an indefinite period of time, and thus the fluid in the chemical chambers will be held back the necessary length of time to allow the gradual out-feed of liquid through the restricted opening or openings 54. This makes the diminutive size of the release chamber 41 compared to the size of the chemical chambers 32, 33 and 34 unimportant in the present apparatus. The release chamber 41 and baffle 40 also make it unnecessary to deliver incoming water from the refill tube 43 at the top of the control chamber 38, as required in the parent application, to prevent the chemicals from feeding back into the flush tank by way of the refill tube after the valves 23 closes.

A certain amount of residual liquid will remain in the tank 30 after the siphoning action is complete and the depth of this residue can be regulated by varying the length of the siphoning passage 51 downwardly into the chemical chamber 34. As stated, the elevation of the strainers 60 may be varied in accordance with the residue level.

Other inherent features of the device will be apparent to those skilled in the art. For example, several different chemicals or components may be placed in the chambers 32, 33 and 34 and one of these could in some instances be a weed killer to eliminate objectionable roots blocking the soil pipe.

Figure 7:
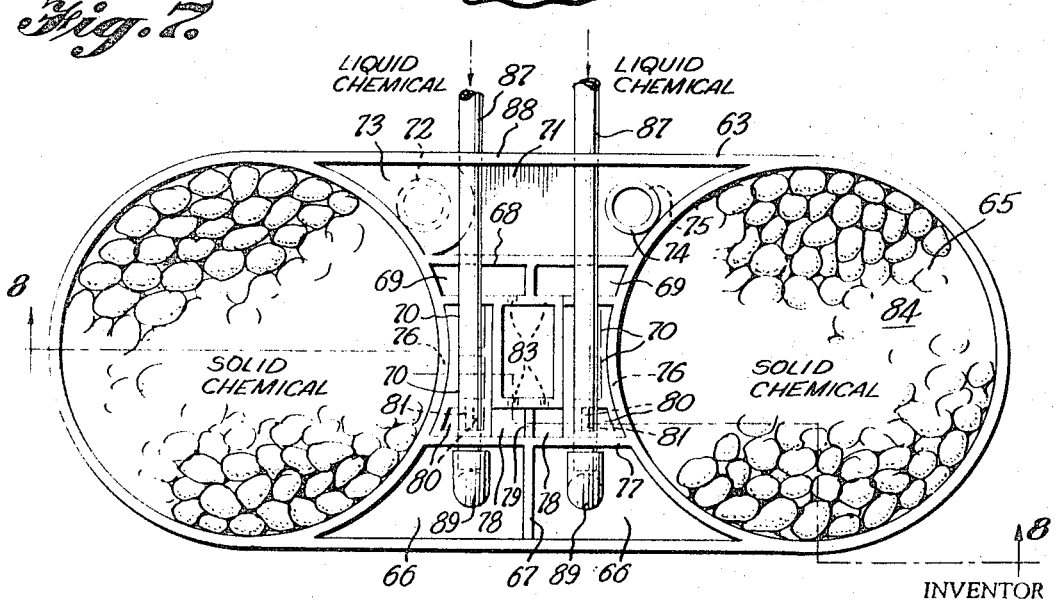
FIGURE 7 is a plan view of a modification whereby liquid and solid material may be introduced into the toilet bowl trap.

In FIGURES 7 to 9 of the drawings, there is shown a modification of the invention wherein both liquid and solid chemical additives or the like may be delivered to the commode trap after completion of the flushing cycle and closing of the inlet valve 23. In accordance with the modification, the device may feed two separate solid substances and two separate liquids, for example, a deodorizer, a disinfectant, a stain remover and a weed or root killer. A feature of the modification is that the several specifically different chemicals or substances are separately maintained in the apparatus and do not comingle until they are actually delivered through the overflow pipe to the commode, and even then, the chemicals can be timed to feed at different rates. In some cases, it may be desirable for example to deliver an alkaline substance to the commode trap at a much more rapid rate than an acid. If desired, the same chemical may be used in two chambers of the apparatus, thus making it possible to increase the amount of or double the application of the given chemical. According to the modification, FIGURES 7 through 9, the apparatus is somewhat more flexible in its usage, but otherwise embodies the same mode of operation and, in general the same construction employed in the previous embodiment.

Referring to FIGURES 7 through 9, the main receptacle 63 corresponding to the previous receptacle 30 has separated large chemical chambers 64 and 65 and a pair of intermediate chemical chambers 66 separated from each other by a wall 67. The openings 37 of the first embodiment placing the chemical chambers in communication are completely omitted in the modification and chambers 64, 65 and 66 are non-communicating.

A wall or baffle 68 is employed, corresponding to the previously-described baffle 40, and defines the outer side wall of a pair of non-communicating release chambers 69, individual to the adjacent pairs of siphoning passages 70, corresponding to the previously-described passages 51. Outwardly of the baffle 68, there is a control chamber 71 having bottom inlet fitting 72, liquid quieting baffle 73 and auxiliary overflow tube 74 with aperture 75, exactly as in the preceding embodiment. Ports 76 serve to place chambers 64 and 65 in communication with a pair of the siphoning passages 70, see FIGURES 7 and 8.

Inwardly of the wall 77 of chamber 66, there is provided a pair of relatively small release chambers 78 separated by a wall 79 and on opposite sides of these two chambers 78 are pairs or banks of siphoning passages 80 having divider partitions 81. The previously-described built-in overflow pipe is indicated by the numeral 82, having small openings 83 just above the receptacle bottom wall 84, placing the overflow pipe 82 in communication with each of the separate release chambers 78 and 69. With this arrangement, as previously noted, the individual chemicals do not comingle until the time they enter the overflow pipe 82 leading to the main overflow pipe 26 of the flush tank.

The two liquid chemicals or additives 85 are contained in elevated wall-mounted bottles 86 or the like, one such bottle being shown diagrammatically in FIGURE 9. Each bottle has a discharge pipe or tube 87 passing through openings in the receptacle walls 88 and 77, as shown, and connecting with an elbow 89 in the upper portion of each chamber 66. A vertically adjustable tube section 90 is carried by each elbow 89 so that the level of the liquid 85 in each chamber 66 can be independently regulated. Each bottle 86 and associated parts constitutes a simple barometric feed which will function to automatically feed the chemical liquid into the particular chamber 66 for holding the liquid level therein at the elevation of the discharge end of the tube section 90. When the liquid level drops below the tube section 90 in a chamber 66, an air bubble will enter the bottle 86 to break the vacuum and allow feeding in a well-known manner. In this manner, separate liquid chemicals are supplied to the two chambers 66. The numeral 91 in FIGURE 9 indicates the opening at the bottom of the inner branch or passage 80 of each pair communicating with the adjacent small release chamber 78.

Operation of modified form

The basic mode of operation during the flushing cycle is the same as in the prior embodiment and need only be briefly repeated. The refill tube 43 admits water to the control chamber 71 where the water will rise and spill over the baffle 68 and into the release chambers 69 and from the bottoms of the release chambers into the siphoning legs 70, FIGURE 9, and finally through passages 76 into the solid chemical chambers 64 and 65. Additionally, a regulated amount of liquid chemical 85 will be fed into each chemical chamber 66, as described, and water will enter the release chambers 78 and the additional siphoning passages 80 and also the chambers 66 while the inlet valve 23 is still open. As in the prior embodiment, when all incoming water flow ceases, the siphoning action will begin to take place, as previously described, and the desired solutions from the chambers 64 and 65 will be siphoned back through the passages 70 and will enter the built-in overflow tube 82 through the individual openings 83. In a like manner, the liquid mixtures in chambers 66 will be siphoned back through the passages 80 to chambers 78 and will then also enter the overflow pipe 82 through the individual openings 83, thus four different chemical solutions can be introduced at this time into the bowl trap after the flushing cycle is completed and without prior comingling of the individual chemicals.

It is to be understood that the forms of the invention herewith shown and described are to be taken as preferred examples of the same, and that various changes in the shape, size and arrangement of parts may be resorted to, without departing from the spirit of the invention or scope of the subjoined claims.

I claim:

1. An apparatus for supplying chemical solutions and the like to a toilet bowl trap, said apparatus comprising a receptacle adapted to be mounted upon the top of an overflow pipe in a toilet flush tank, said receptacle being compartmented and having end chemical chambers, a connecting intermediate chemical chamber communicating with said end chambers, a control chamber and a release chamber separated from the control chamber by a baffle, a central overflow pipe section in said receptacle having a discharge end communicating with the flush tank overflow pipe, said overflow pipe section having a restricted opening adjacent the bottom of said receptacle communicating with the release chamber, pairs of siphoning passages on opposite sides of said central overflow pipe section and communicating with the release chamber and the intermediate chemical chamber, whereby upon completion of the flushing cycle a solution may be siphoned from the chemical chambers through the siphoning passages and into the release chamber and from the release chamber through the restricted opening to said overflow pipe section.

2. The invention as defined by claim 1, and an auxiliary overflow pipe in the control chamber and opening through the bottom of the receptacle and having a restricted opening in its side wall adjacent the bottom of the control chamber.

3. The invention as defined by claim 1, and perforated strainer supports for solid chemicals within the lower portions of the end and connecting chemical chambers.

4. Apparatus for supplying chemical solutions and the like to the trap of a toilet bowl comprising a compartmented receptacle adapted for mounting upon the top of the main overflow pipe in a toilet flush tank, said receptacle having end relatively large chemical chambers, at least one intermediate chemical chamber, an opposite side control chamber and at least one release chamber separated from the control chamber by a baffle, a central fixed overflow pipe section on said receptacle opening through the bottom wall thereof, plural siphoning passages adjacent the sides of the overflow pipe section and inwardly of said chemical chambers and release chamber, restricted port means placing the overflow pipe section in communication with the release chamber, and additional port means interconnecting each of the chemical chambers with at least one of said siphoning passages.

5. The invention as defined by claim 4, and wherein the receptacle has a pair of separated non-communicating intermediate chemical chambers which also do not communicate with said end chemical chambers, there being separate pairs of siphoning passages for each said chemical chamber in communication therewith and a separate release chamber for each adjacent pair of siphoning passages, each release chamber having a restricted opening leading to said central overflow pipe section.

6. The invention as defined by claim 5, and means for automatically feeding a liquid into each of said intermediate chambers from separate remote sources.

7. The invention as defined by claim 6, and wherein the automatic feeding means for said liquid comprises barometric-type feeding devices for maintaining a liquid level in said intermediate chambers.

References Cited

UNITED STATES PATENTS

| 1,170,387 | 2/1916 | Andrews | 4—227 |
| 2,479,842 | 8/1949 | Kirwan | 4—224 |

FOREIGN PATENTS

| 933,496 | 1/1948 | France. |

LAVERNE D. GEIGER, *Primary Examiner.*

H. J. GROSS, *Assistant Examiner.*

U.S. Cl. X.R.

137—268; 222—416